(12) United States Patent
Gibbons et al.

(10) Patent No.: US 6,536,982 B2
(45) Date of Patent: Mar. 25, 2003

(54) CABLE CLAMP

(75) Inventors: Peter Gibbons, Dubai (ZA); Chris Manning, Walton Cardiff (GB)

(73) Assignee: Alan Dick & Company Limited, Cheltenham (GB)

( * ) Notice: Subject to any disclaimer, the term of this patent is extended or adjusted under 35 U.S.C. 154(b) by 20 days.

(21) Appl. No.: 09/773,819

(22) Filed: Feb. 2, 2001

(65) Prior Publication Data

US 2002/0037193 A1 Mar. 28, 2002

(30) Foreign Application Priority Data

Sep. 27, 2000 (GB) .............................. 0023658

(51) Int. Cl.$^7$ ............................................... F16C 1/00
(52) U.S. Cl. ......................................... 403/97; 403/391
(58) Field of Search ............................ 403/391, 96, 97, 403/110

(56) References Cited

U.S. PATENT DOCUMENTS

| | | | | | |
|---|---|---|---|---|---|
| 1,420,790 A | * | 6/1922 | Varney | ........................ | 403/391 |
| 1,631,831 A | * | 6/1927 | Palmer-Jones | ............... | 403/97 |
| 1,706,215 A | * | 3/1929 | Davidson | ..................... | 403/97 |
| 1,835,473 A | * | 12/1931 | Davidson | ..................... | 403/97 |
| 1,882,483 A | * | 10/1932 | Cannon | ....................... | 403/391 |
| 2,712,116 A | * | 7/1955 | Blanchard | ............... | 403/391 X |
| 2,963,679 A | * | 12/1960 | Jugle | ..................... | 403/391 X |
| 3,025,089 A | * | 3/1962 | Ramsden | ..................... | 403/391 |
| 3,126,191 A | * | 3/1964 | Holden | ........................ | 403/97 |
| 3,495,857 A | * | 2/1970 | Hawke et al. | ................. | 403/97 |
| 3,937,451 A | * | 2/1976 | DiPaola et al. | ............. | 403/385 |
| 4,142,813 A | * | 3/1979 | Laborde | ...................... | 403/391 |
| 5,017,038 A | * | 5/1991 | Kurosaki | ..................... | 403/385 |
| 5,167,466 A | * | 12/1992 | Hsieh | ........................... | 403/97 |
| 5,588,630 A | * | 12/1996 | Chen-Chao | .................. | 248/514 |
| 5,707,169 A |  | 1/1998 | Schweighofer et al. | | |
| 5,794,897 A | * | 8/1998 | Jobin et al. | ............. | 403/391 X |
| 5,941,483 A |  | 8/1999 | Baginski | | |

FOREIGN PATENT DOCUMENTS

| | | |
|---|---|---|
| GB | 0 069 322 A | 8/1981 |
| GB | 2 312 543 A | 10/1997 |
| GB | 2 351 117 | 12/2000 |
| GB | 2 351 317 A | 12/2000 |
| JP | A 7-198069 | 8/1995 |
| JP | A 2001-245425 | 9/2001 |

OTHER PUBLICATIONS

Technical Publication Relating To Clamps and Cleats (No Publication Date).

* cited by examiner

Primary Examiner—Lynne H. Browne
Assistant Examiner—David E. Bochna
(74) Attorney, Agent, or Firm—Young & Thompson

(57) ABSTRACT

A cable clamp includes at least two elements which, preferably are interference-fittable together by way of male and female members. The cable clamp may also have on one or more of the elements, a ratchet mechanism on a surface which abuts against the face of a second cable clamp positioned against the first cable clamp. The ratchet mechanism allows the first and second cable clamps to be positioned relative to one another in a controlled manner.

15 Claims, 5 Drawing Sheets

CABLE CLAMP

FIELD OF THE INVENTION

This invention relates to a cable clamp and more particularly, to a cable clamp for use with mobile telephone masts.

BACKGROUND OF THE INVENTION

Cable clamps commonly are provided as single piece devices, or two piece devices, which fit around a cable and then the whole arrangement comprising the clamp and the cable, is fitted by a separate device to a support structure, such as a cable mast for mobile phones. Such devices have the disadvantage that cable needs to be threaded through the clamp, which can make installing cables both difficult and time consuming. Also, in the case of two piece clamp connectors, it is necessary to separate the two pieces of the connector while the cable is being positioned in the connector. This can have the problem that when the two pieces are to be connected together again, once the cable is positioned, it is necessary to position the two parts of the connector so that the connecting parts on the two pieces are brought into a position where they will join. This can involve a degree of trial and error in locating the connecting parts and it may even be the case that a person installing the cable connector may not actually connect the two parts at all.

Cable clamps are known, such as those discussed in GB 2296393, which comprise a cable clamp having two hinged parts, which are fastened around a cable that is inserted in the clamp. However, this arrangement includes a pair of clamp elements, which have to be screw-driven down to hold the cable within the clamp. The use of a separate screw-mechanism increases the difficulties of installing such clamps, as it may not be easy to access the screw-mechanism, which could result in poor fixing of the two clamp halves together. Also it is necessary to ensure that the screw and receiving mechanism are in alignment so that the two parts will be held together properly. Should poor fixing occur the cable could eventually work loose from the clamp, with the consequence that repairs would have to be carried out to ensure that the cable is properly secured to a cable mast.

SUMMARY OF THE INVENTION AND ADVANTAGES

In accordance with the present invention, there is provided a cable clamp comprising first and second body elements, each defining a cable recess so that when the elements are brought together with the recesses aligned, they substantially encircle a cable location, with at least one of the elements having a projection and the other a co-operating opening whereby in the aligned position of the elements, the projection is received in said opening, but in a rotated position of the elements, the projection seats on the other of the elements to hold the elements apart to allow access to the cable location.

Preferably, the projection and opening are interference fittable when brought into a mating arrangement. In addition, the cable recesses extend around opposing portions of the outer surface of the cable.

Preferably, first and second elements each have respective projections in the form of male members comprising split pins extending from a first surface of each respective element, said first surface defining the opening for a male member on the opposed element which is adjacent the male member.

It is particularly preferred that the first and second elements have at least one pair of male and female members with the male members diagonally opposed to one another on the first surface whereby when in mating relationship the male and female members align along their length to form a pin member extending between the first and second elements.

For example, the male members may be inter-engaging surfaces so that as one engages its opposed pair, it is located above the associated opening. Thus, if the male members are semi-circular in section, their flat surfaces engage.

The male and female members may be integrally molded on the elements making up the cable clamp connector. In a second aspect, the invention consists in cable clamp comprising at least two elements connectable together to form said cable clamp, with at least one of said elements having a ratchet mechanism on an outer surface of said element.

The ratchet mechanism on a surface of the cable clamp can be positioned to abut against a face of a second cable clamp connector which is positioned against the first cable clamp. The ratchet mechanism allows the first and second cable clamps to be rotatably positioned relative to one another in a controlled manner.

From a third aspect, the invention consist in a cable clamp comprising first and second elements, each defining a cable recess so that when the elements are brought together with the recesses aligned, they substantially encircle a cable location, at least one of the elements having a projection and a cooperating opening to secure the elements together when the first and second elements are brought into a mating arrangement, wherein one or more of the elements also has a ratchet mechanism on an outer surface which when said outer surface is positioned against a correponding outer surface of a further element, enables both elements to move relative to one another.

The present invention and embodiments thereof, provide a cable clamp, which can be locked into position by a single action. The use of a single action securing mechanism avoids the need for separate securing means for screwing clamping members together, which is a major disadvantage of the prior art. In addition the present invention provides a twist and hold mechanism whereby the positioning of at least one of the projections on the first or second element, or indeed on both elements, allows the two recessed members to be held apart while the cable is inserted in the recess. This feature has a major advantage in that the need to position connecting members so that they engage is negated, which means that the clamp is easier, quicker and safer to install, especially is situations where access is not readily available.

Further, the ratchet mechanism that may be provided on the cable clamp of the present invention, means that stacked clamps may be positioned relative to one another by a simple twisting operation. The use of such a ratchet mechanism again has the advantage of providing a cable clamp connector, which is easy to install, as access for fitting the clamp is not crucial for installation. Also as the cable clamp of the present invention avoids the need for many fixing parts, the clamp can be easily installed, thereby reducing the need for specially trained installation engineers. This feature has major advantages in less developed countries where there may be a shortage of skilled workers.

BRIEF DESCRIPTION OF THE FIGURES

Other advantages of the present invention will be readily appreciated as the invention becomes better understood by reference to the following detailed description as illustrated and with reference to the accompanying drawings in which.

DETAILED DESCRIPTION OF THE INVENTION

Figure 1:
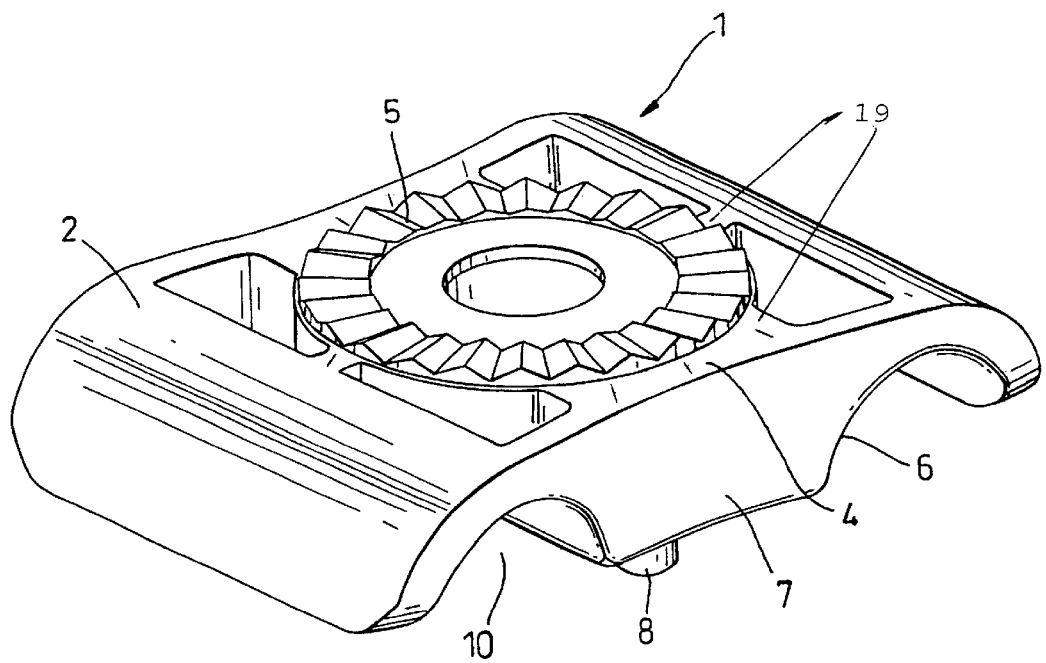
FIG. 1: shows a top perspective view of one part of the cable clamp showing the ratchet mechanism.
Figure 2:
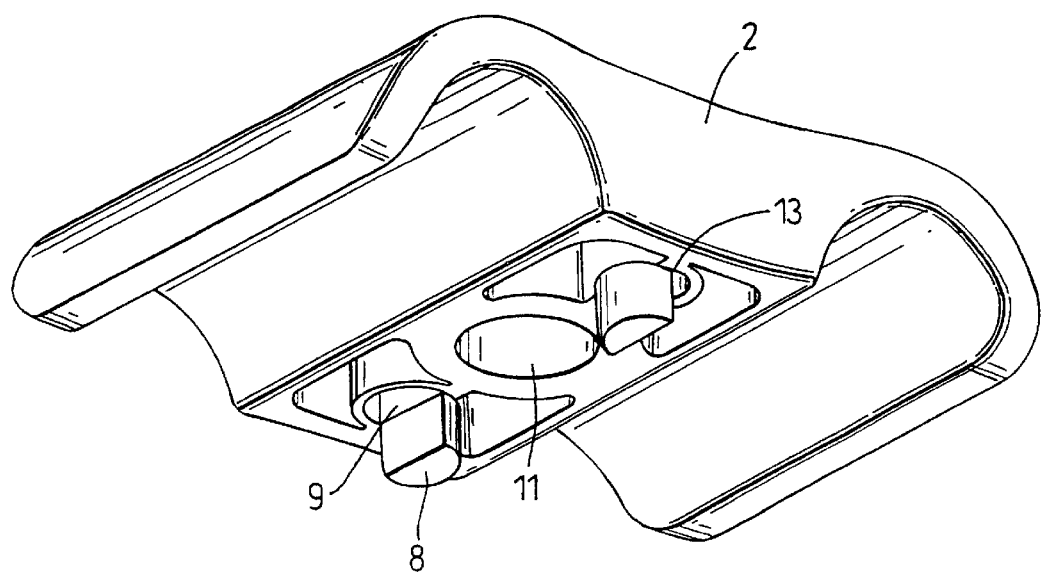
FIG. 2: shows a perspective view from below, of the part of the cable clamp as shown in FIG. 1.

The cable clamp 1 comprises at least one first element 2 as shown in FIGS. 1 and 2. As shown in FIG. 1, the first element 2 is of a substantially rectangular shape with the ends of the rectangle curving downwards and away from an upper face 4 of the body portion. The upper face 4 includes a circular ratchet mechanism 5 positioned on said upper face 4. Preferably the ratchet mechanism is circular but it is envisaged that other curved ratchet mechanisms could be used, for example semi-circular ratchet mechanisms or indeed, linear ratchet mechanisms may be used. Preferably, the ratchet mechanism is integrally molded with the upper face 4. The ratchet mechanism 5 preferably includes a series of marked graduations 19 positioned at, e.g., 15° intervals. These intervals may be numbered so that the first element 2 can be positioned at a pre-defined position, with respect to a further element placed adjacent to said first element 2.

Figure 4:
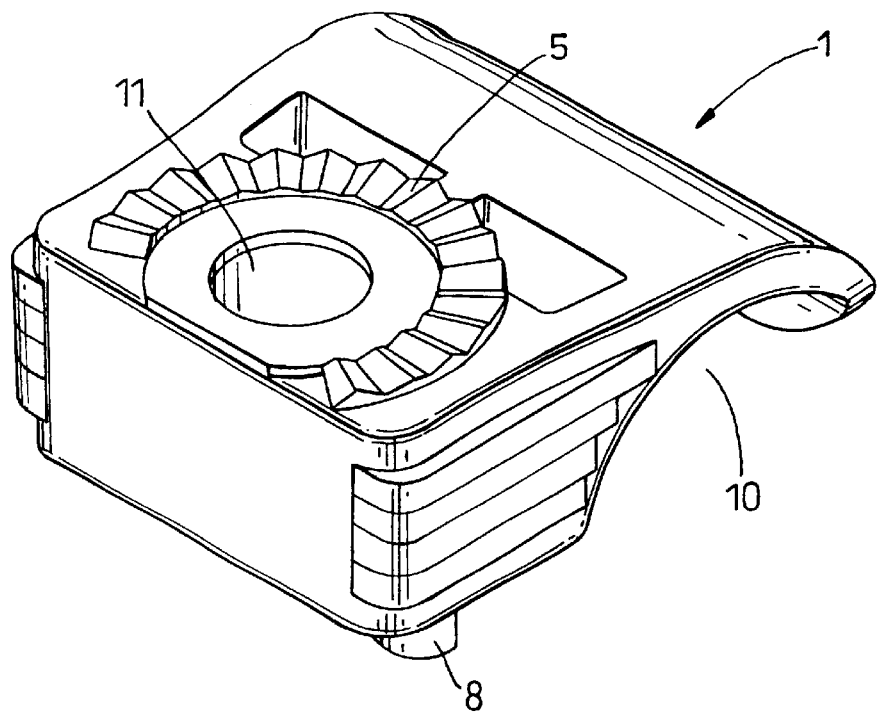
FIG. 4: shows a perspective view from above showing a single recess cable clamp with the ratchet mechanism on the upper surface and a pin on the lower surface.
Figure 5:
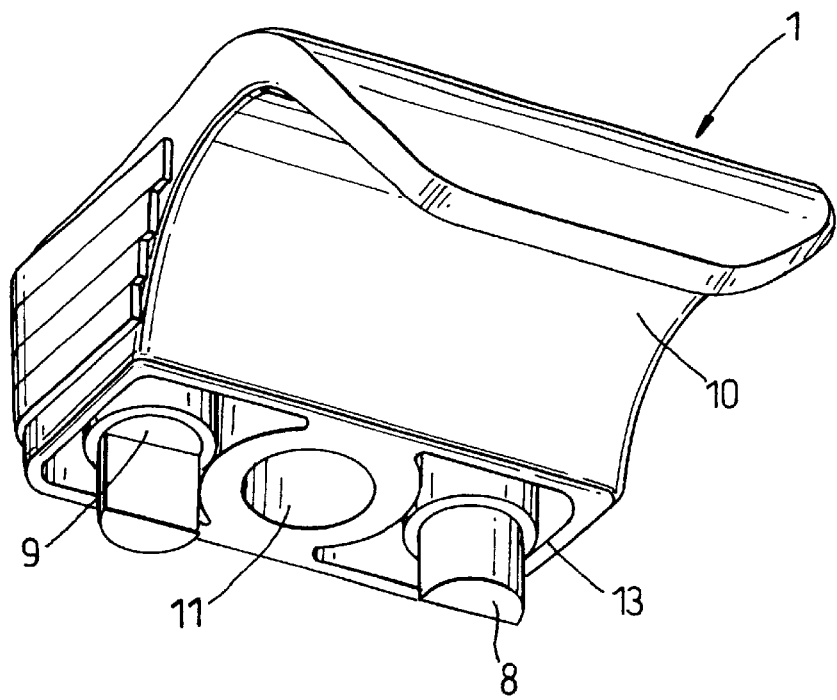
FIG. 5: shows a perspective view from below of the bottom of a single recess cable clamp showing pins depending from a lower surface, with the pins being in a diagonally opposed relationship.

The first element 2 also has a second face 6, forming the underside of the upper face 4. The first element 2 has a central region 7 extending down from the second face 6 in the same lateral direction as the ends of the rectangular body portion 2. This central region 7 has projections 8 extending therefrom as well as openings 9 (shown in FIG. 2) in its surface which, are positioned adjacent said projections 8. The second face 6 also has two substantially semi-circular recesses 10 which are formed by the ends of the first element 2, extending downwards from first face 4 and by the central region 7. Although the figures show two recesses 10, it is envisaged that one recess may be used as shown in FIGS. 4 and 5, or multi-recessed cable clamps may be provided, depending on the number of cables to be held. The appearance of the first element 2, when viewed from the side is of a bridge having two semi-circular spans on either side of a leg formed by central region 7.

Figure 3:
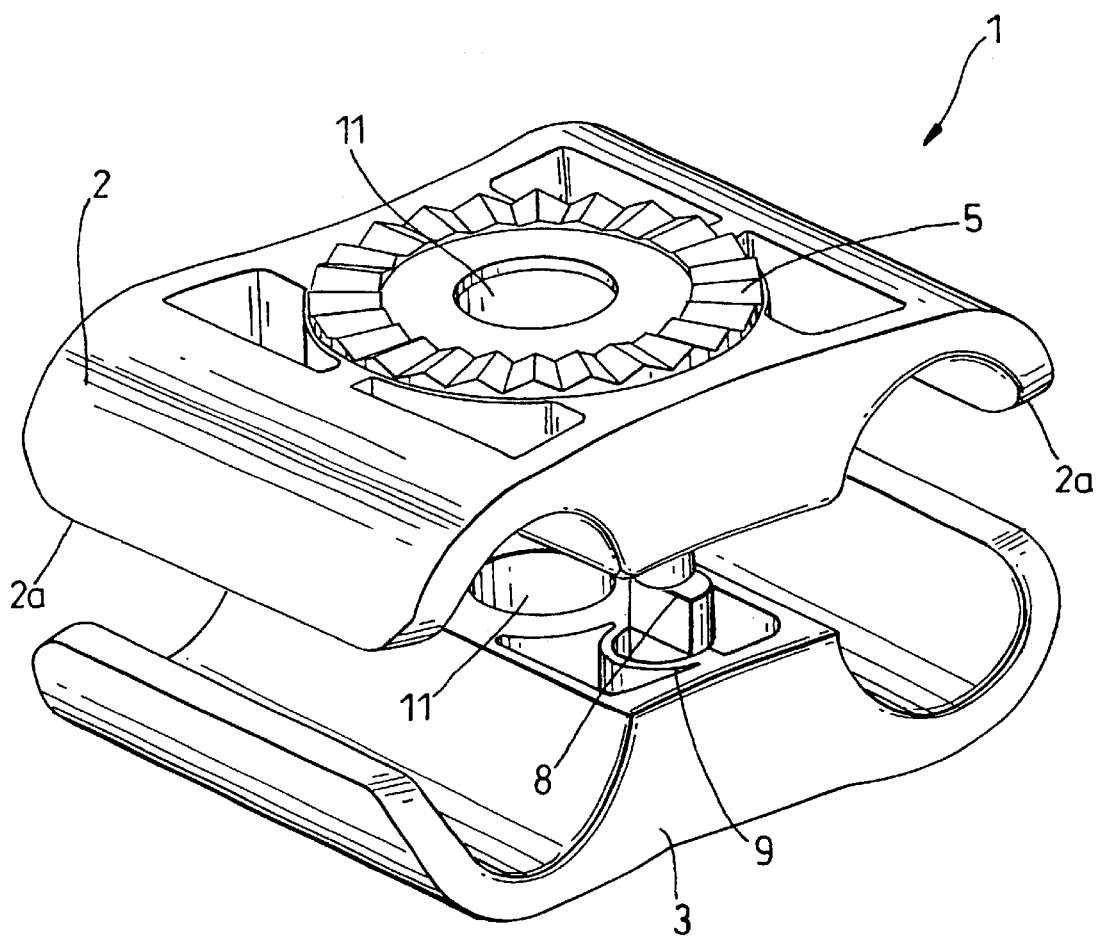
FIG. 3: shows a first and second cable clamp being brought into mating arrangement with one another.

The second element 3 (as shown in FIG. 3) is a mirror image of first element portion 2 (shown in FIG. 2). The central region 7 of second element 3 would be substantially the same as that shown for first element 2, in FIG. 2, with the openings 9 and projections 8 (provided as split pins) being more clearly shown in FIG. 2. The end profile of the projection 8 is of a semi-circle. The opening 9, which is adjacent the projection 8 is also semi-circular and the opening and projection together form a circular area 13. Also there is a central circular aperture 11 extending through the first and second elements, and in a preferred embodiment, is positioned between the areas 13 and this is for receiving a bolt which can pass through the axis of the first and second elements 2 and 3. The central region 7 has two circular areas 13 on either side of a central circular aperture 11. When viewed from above, a first of said circular areas has a split pin on the left of said circular area, while the second of said circular areas has the split pin to the right of said circular areas providing split pins and apertures which are in opposed diagonal relationships. By having this relationship, the two elements 2,3 cannot be twisted relative to each other and are held in a more secure arrangement because the flat face of a split pin on one element abuts against the flat face of a split pin on a second element, which results in providing a firm interference fit. However, it is envisaged that the split pins may be in other arrangements for example, they may be on the same side of the circular areas thereby being in linear arrangement or they may be in a staggered arrangement, for example a three-two arrangement and certain arrangements will be appropriate for certain uses for the cable clamp.

As shown in FIG. 3, the first and second elements are positioned so that the central regions 7 are facing and then the elements 2,3 are pushed together to form a complete cable clamp 1. The projections 8 on the first element 2 are pressed into the openings 9 of the second element 3 and substantially simultaneously, the projections on the second body portion 3 are pressed into the openings 9 on the first element 2. The outer ends 2a of the cable recesses meet before the projections 8 are fully inserted in the apertures 9 and this provides a controlled meeting of the two parts by providing support at the outer ends of the clamp 1 before the central regions are finally pushed together. This feature is important when delicate cables are to be clamped in order to prevent damage to the cables. This results in the central circular apertures 11 of the two elements being aligned so that a bolt can pass there through. Also, the recesses 10 of respective elements are brought into alignment and in doing so create a substantially circular aperture 12, which is substantially at right angles to the aperture central circular apertures 11. These substantially circular apertures 11 extend substantially around the whole outer surface of a cable positioned between the elements 2,3 and clamp it in position.

Figure 6:
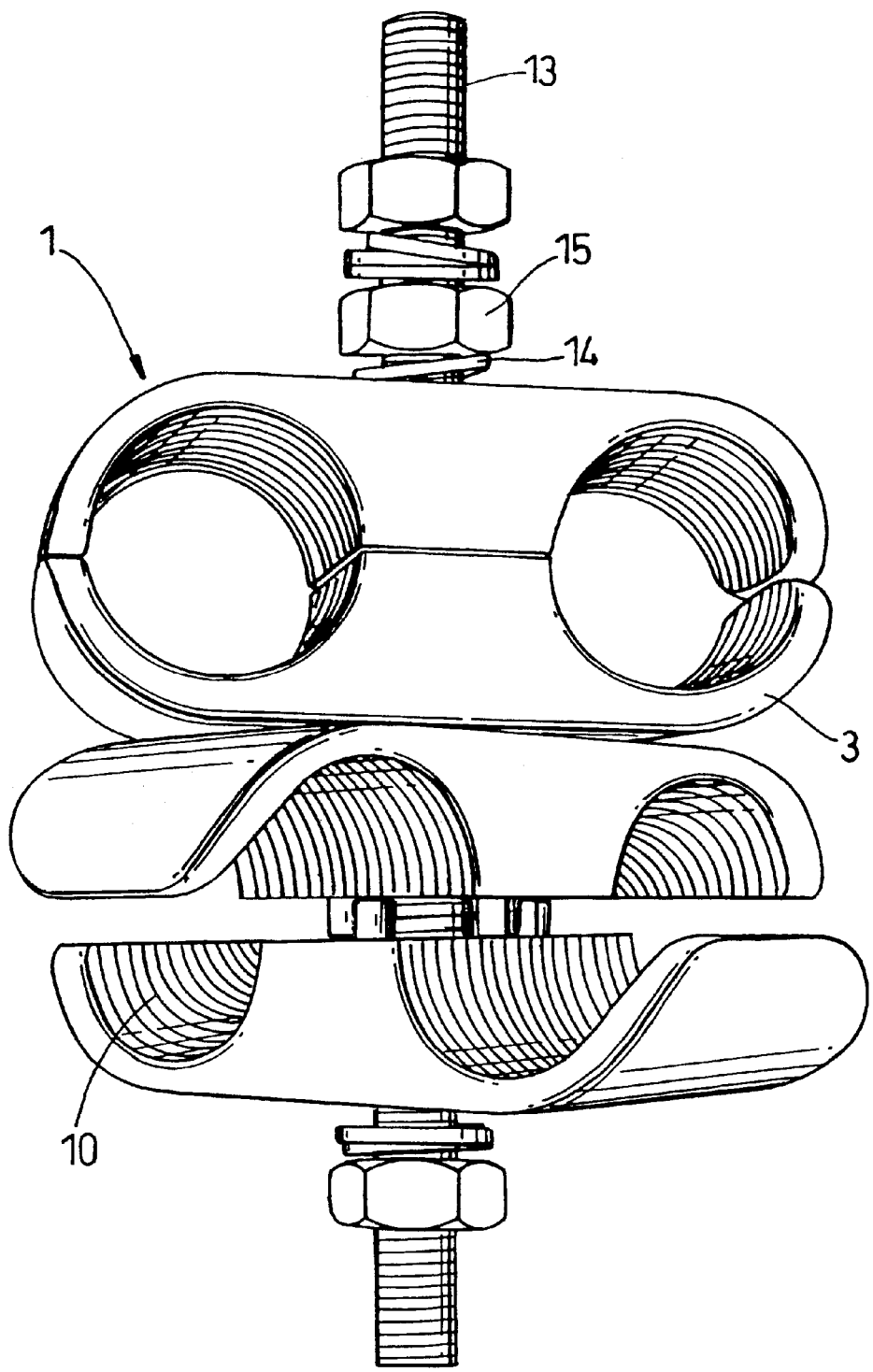
FIG. 6: shows a stacked arrangement of cable clamps with the cable clamps being twisted relative to one another, with the first and second elements of the cable clamp being held apart by projections.

As shown in FIGS. 4 and 5, the cable clamp may have ridge surfaces on the cable recesses 10, extending to central region 7 and these ridge surfaces are more clearly shown in FIG. 6. These ridge regions provide a raised anti-slip surface to hold the cable in position. FIGS. 4 and 5 show a cable clamp having the main features of those shown in the previous figures, however, these clamps have one recess rather than two recesses. Ridges may also be present on the outer surface of the central region 7, so providing a grip surface for engineers installing the clamp which is of particular use in wet conditions.

Figure 7:
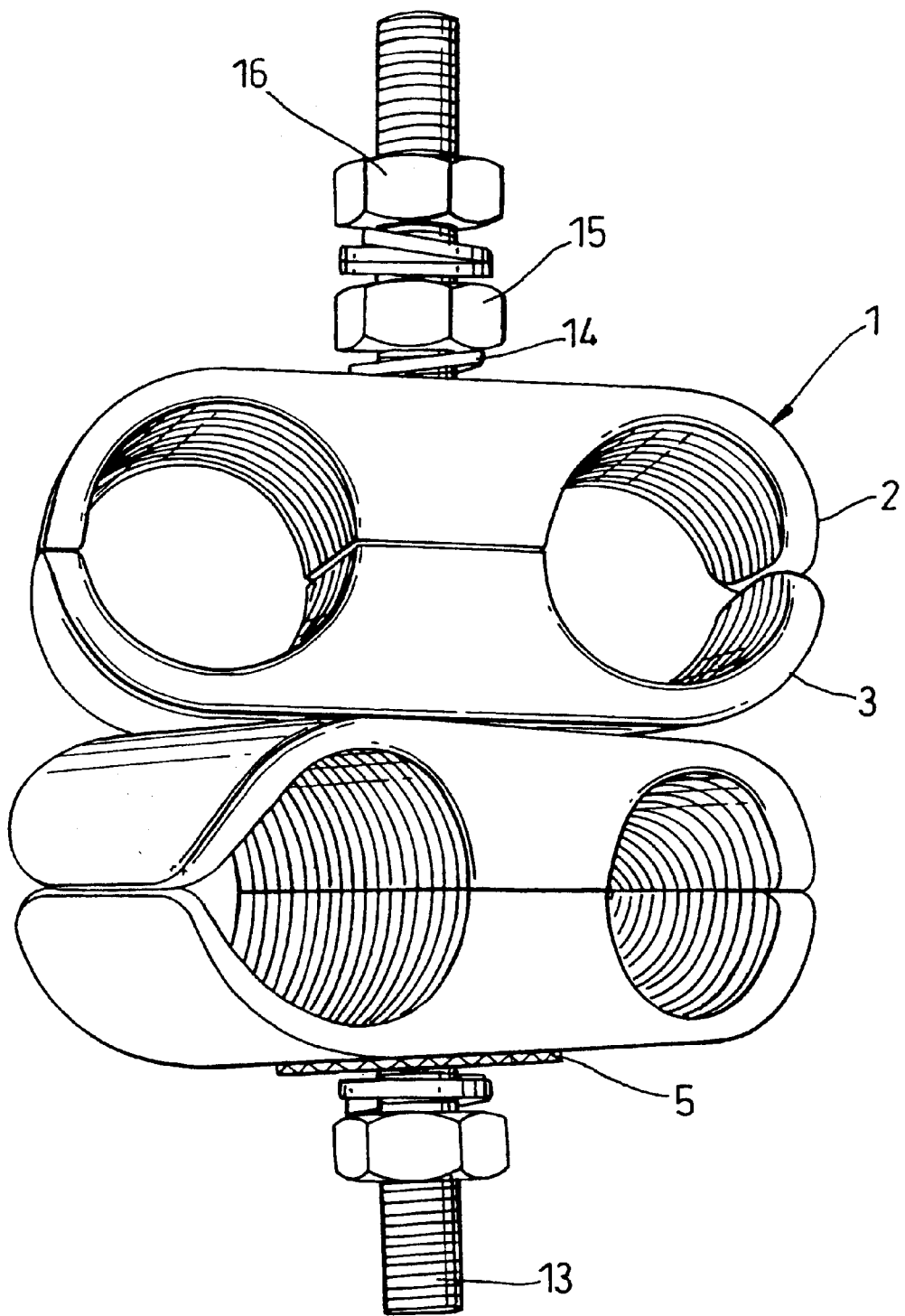
FIG. 7: shows a stacked arrangement of cable clamps with the cable clamps being twisted relative to one another, with the first and second elements being held together.

With the elements 2,3 joined to form a cable clamp 1, as shown in FIGS. 6 and 7, the first element 2 may be rotated relative to a further element by using the ratchet mechanism 5. A series of cable clamps are held by a bolt passing through a central axis, as shown in FIG. 6. The whole arrangement is held together by a bolt 13, passing through aperture 11. At the end of the stacked arrangement, there is a split pin 14 between the ratchet 5 face of the last cable clamp and the bolt nut 15. The washer is preferably a spring washer, such as a split washer and allows the cable clamp 1 to be rotated by a simple loosening of the bolt nut 15. This features allows a degree of axial play so avoiding the need to disassemble the stacked arrangement when twisting individual cable clamps relative to one another. The whole arrangement may have a further bolt nut 16 securing the whole stacked arrangement of cable clamps, together. FIG. 6 shows a stack of cable clamps in which the lower cable clamp 1 is separated to allow insertion of a cable in a cable recess, while FIG. 7 shows the cable clamp secured as it would be once a cable is in position in the clamp.

A preferred feature of the invention is that the elements 2,3 are formed of a plastics material. Preferably, the plastics is a weather and UV resistant polypropylene to withstand severe environmental conditions. In the interests of environmental concerns the elements may be made from recycled materials. However, it is envisaged that the elements may be manufactured from other materials, such as metal, where they are to be used in a particular environment. It is also desirable to colour code the elements where they are to be used with particular types of cables, so making cable identification simple for maintenance engineers.

Further, although the invention has been described with respect to the holding of two cables in a cable clamp, it is envisaged that clamps for single cables or multiple cables fall within the invention.

Further, although the projections are set to friction fit together, they may snap-lock together to provide increased strength for securing the two elements together.

What is claimed is:

1. A cable clamp, comprising:
   first and second body elements, each defining a cable recess so that when the elements are brought together with the recesses aligned, they substantially encircle a cable location,
   at least first element having a projection and the second element having a co-operating opening such that in the aligned position of the elements, the projection is received in said opening, but in a rotated position of the elements, the projection seats on the second element to hold the elements apart to allow access to the cable location,
   the projection comprising a split pin extending from the first element, wherein,
   the split pin of the first element is diagonally opposed to a split pin on the second element so that when first and second elements are brought into mating relationship, respective split pins align along a flat surface of their length to form a pin member which holds the first and second elements together.

2. A cable clamp according to claim 1 in which the projection and opening are interference fittable when brought into a mating arrangement.

3. A cable clamp according to claim 2, wherein the split pin of the first element is adjacent at least one opening for receiving the split pin from the second element.

4. A cable clamp connector according to claim 3, wherein a fixing means extends through the first and second elements both of which can rotate on said fixing means.

5. A cable clamp according to claim 1, further comprising at least two elements connectable together to form said cable clamp, with at least one of said elements having a ratchet mechanism on an outer surface of said element.

6. A cable clamp connector according to claim 5, wherein the ratchet mechanism is integrally molded with the outer face of said element.

7. A cable clamp connector according to claim 6, wherein the ratchet mechanism is circular.

8. A cable clamp connector according to claim 7, wherein the ratchet mechanism has a graduated scale thereon.

9. A cable clamp according to claim 8, further comprising a bolt threaded passing through the first and second elements, with the ratchet mechanism extending around a circumference of said bolt.

10. A cable clamp according to claim 1, wherein, at least one of the first and second body elements also has a ratchet mechanism on an outer surface which when said outer surface is positioned against a corresponding outer surface of a further body element having a complimentary ratchet mechanism, both elements are able to move relative to one another by way of said ratchet mechanism.

11. A cable clamp connector according to claim 10, wherein a projection on at least one of the body elements is positioned so that on movement of the first element relative to the second element, the projection of said first element comes to rest on a raised area of the second element, so holding the at least one cable recess of the first and second elements away from, and in spaced relationship from one another.

12. A cable clamp connector according to claim 11, wherein the ratchet mechanism enables the first and second elements to move relative to one another.

13. A cable clamp according to claim 12, wherein the ratchet mechanism is circular and extends around a fixing means passing though the ratchet mechanism and through the first and second elements.

14. A cable clamp comprising:
    a first body element; and
    a second body element,
    each of the first and second body elements defining a cable recess such that the first and second body elements, brought together into an aligned position with the recesses aligned, substantially encircle a cable location,
    the first body element having a projection comprising a split pin extending from the first body element,
    the second body element having a projection comprising a split pin extending from the second body element and an opening extending into the second body,
    the split pin of a first body element being diagonally opposed to the split pin of the second body element so that when first and second body elements are brought into a mating relationship, respective split pins align along a flat surface of their length to form a pin member which holds the first and second body elements together, wherein,
    in the aligned position of the first and second body elements, the projection of the first body element is received in the opening of the second body element, and
    in a rotated position of the first and second body elements, the projection of the first body element seats on the second body element to hold the first and second body elements apart to allow access to the cable location.

15. A cable clamp assembly, comprising:
    a first body element and a second body element forming a first cable clamp; and
    a third body element and a fourth body element forming a second cable clamp,
    each of the first, second, third and fourth body elements defining a cable recess such that
    the first and second body elements, brought together into an aligned position with the recesses aligned, substantially encircle a first cable location, and
    the third and fourth body elements, brought together into an aligned position with the recesses aligned, substantially encircle a second cable location, and each of the first, second, third and fourth body elements having a projection comprising a split pin extending from that body element and an opening adjacent the projection, the split pin of a first body element being diagonally opposed to the split pin of the second body element so that when first and second body elements are brought into a mating relationship, respective split pins align along a flat surface of their length to form a pin member which holds the first and second body elements together, the split pin of a third body element being diagonally opposed to the split pin of the fourth body element so that when third and fourth body elements are brought into a mating relationship, respective split pins align along a flat surface of their length to form a pin member which holds the third and fourth body elements together, the first and third body elements each having a ratchet mechanism on an outer surface, wherein, the ratchet mechanisms of the first and third body elements complimentarily align with each other so that when the ratchet mechanism of the first body element is aligned against the ratchet mechanism of the third body element, the first cable clamp is able to be moved relative to the second cable clamp by way of the aligned ratchet mechanisms, wherein, in the aligned position of the first and second body elements, the projection of the first body element is received in the opening of the second body element, and in a rotated position of the first and second body elements, the projection of the first body element seats on the second body element to hold the first and second body elements apart to allow access to the cable location.

* * * * *